United States Patent [19]

Chi-Sheng

[11] Patent Number: 5,097,856

[45] Date of Patent: Mar. 24, 1992

[54] ELECTRONIC TALKING STICK FOR THE BLIND

[76] Inventor: Hsieh Chi-Sheng, 6Fl., 81, 2, Chang An E. Rd., Taipei, Taiwan

[21] Appl. No.: 640,903

[22] Filed: Jan. 14, 1991

[51] Int. Cl.⁵ .............................................. A61H 3/02
[52] U.S. Cl. ..................... 135/72; 135/911; 381/51
[58] Field of Search ............ 135/72, 88, 65, 911; 364/460, 461, 708, 710.12; 381/51-53

[56] References Cited

U.S. PATENT DOCUMENTS

| | | | |
|---|---|---|---|
| 3,158,851 | 11/1964 | Ruthven | 135/85 X |
| 3,546,467 | 12/1970 | Benjamin, Jr. et al. | 135/65 X |
| 3,996,950 | 12/1976 | Mier | 135/85 X |
| 4,280,204 | 7/1981 | Elchinger | 135/DIG. 11 X |
| 4,858,125 | 8/1989 | Washizuka et al. | 135/65 X |
| 4,870,687 | 9/1989 | DeLeon | 381/51 |

*Primary Examiner*—David A. Scherbel
*Assistant Examiner*—Lan Mai
*Attorney, Agent, or Firm*—Asian Pacific Int'l Patent and Trademark Office

[57] ABSTRACT

This invention relates to an electronic talking stick for the blind and more particularly to a stick which talks to instruct a blind man to walk and go upstairs and downstairs, and to warn a blind man of dangerous depression in road, and which calls for help when a blind man who uses the stick falls. It is generally comprised of a supporting rod, a control box, a handle, a free steering caster, and a horizontal scanning device, in which the free steering caster helps the whole assembly to slide; two detectors in the control box and a range finder and moving object detector in the handle are arranged for trouble detection to let detected signals be converted into voice, by means of the processing through a control circuit, to instruct the user through an earphone connected to the handle.

8 Claims, 10 Drawing Sheets

ELECTRONIC TALKING STICK FOR THE BLIND

BACKGROUND OF THE INVENTION

The present invention is related to an electronic talking stick for the blind to help a blind man to walk, which utilizes synthetic voice to inform passers or the blind man of the existing situation. It indeed helps to solve the problems a blind man may encounter while carrying a conventional stick or being guided by guide dog.

In U.S. Pat. No. 4,280,204, a cane for the blind provided with an ultrasonic obstacle sensing apparatus is disclosed, wherein a transducer 16 is mounted on shank portion 14 of the cane 10 to transmit and receive a directional, multiple lobe pattern of ultrasonic energy, whereby when an elevated obstacle is detected, an obstacle detection signal is transmitted by an AM transmitter through antenna 86 to an AM receiver 84 where it is heard by visually impaired person 80. The protective zone provided for a cane user with this arrangement is quite limited and the obstacles detected can not be identified to be a passer or a stationary object.

In U.S. Pat. No. 3,546,467, a relatively costly and complex mobility cane utilizing a plurality of aesthetically objectionable, object detecting, coherent (laser) sensor pairs, is described. Highly directional transmitting and receiving sensors are mounted in a spaced relation on the cane shank. The ability to adjust the object sensors to the desired maximum object detection range is dependent upon the ability to mechanically set the angular position of each sensor with respect to the cane shank. Accordingly, an object must actually intersect a relatively narrow light beam in order to be detected and the protective zone is also very limited.

U.S. Pat. No. 2,496,639 discloses a mobility cane employing a pair of ultrasonic energy transmitting and receiving piezoelectric transducers. This particular cane is less complex than the above-mentioned U.S. Pat. No. 3,546,467. However, it suffers all of the shortcomings of the U.S. Pat. No. 2,496,639.

According to the present invention, an electronic talking stick for the blind includes a telescopic supporting rod, a control box, a handle mounted on the supporting rod and a free steering caster mounted under the control box. The handle and the control box are provided with detecting device and processing system to automatically detect road obstructions and convert detected signals into voice to inform the user or the person detected. According to the present invention, the supporting rod is rotatable and telescopic, and the DC power supply is rechargeable.

SUMMARY OF THE INVENTION

It is an object of this inention to provide an electronic talking stick for the blind, which can talk to instruct a blind man to walk and go upstairs and downstairs, and to warn a blindman of dangerous depression in road, and which calls for help when a blind man who uses the stick falls. It is generally comprised of a supporting rod, a control box, a handle, a free steering caster, and a horizontal scanning device, in which the free steering caster helps the whole assembly to slide; two detectors in the control box and a range finder and moving object detector in the handle are arranged for trouble detection, converting detected signals into voice, by means of the processing through a control circuit, to instruct the user through an earphone connected to the handle.

DETAILED DESCRIPTION OF THE PREFERRED EMBODIMENT

Figure 1:
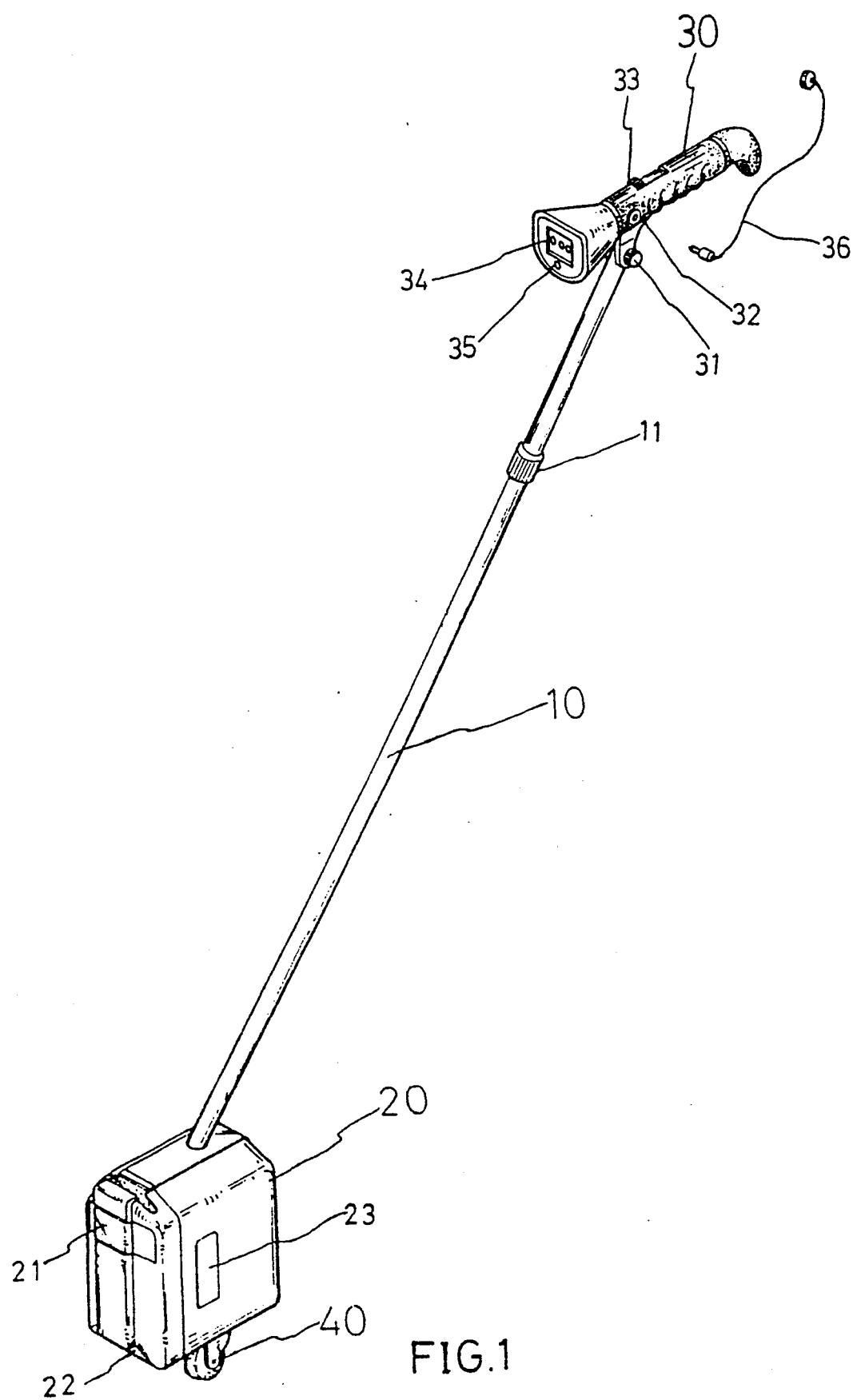
FIG. 1 illustrates an electronic talking stick embodying the present invention.

Referring to FIG. 1, which illustrates an electronic talking stick for the blind embodying the present invention which includes a supporting rod (10), a control box (20), a handle (30), and a free steering caster (40). According to the present invention, the full length of the electronic talking stick is set within 110 cm–150 cm. The supporting rod (10) is telescopic, including two elongated segments controlled by a revolving coupler (11), the full length of which may be flexibly arranged to fit for use by a blindman within 150–180 cm in height. The handle (30) is mounted on the supporting rod (10) at the top and firmly secured thereto by means of a control knob (31) through which the angular position of the handle (30) on the supporting rod (10) may be flexibly adjusted according to user's preference and convenience. A power switch (33) is mounted on the handle to control power supply, and an earphone socket (32) is located on the handle (30) for connection thereto of an earphone (36) to help a blindman to receive voice instruction from the control box (20) while the blindman passes through a noisy environment.

When a user is ready to walk, one may hold the handle (30) with one hand and push the power switch (33) forward to the ON position to connect electric power supply. Immediately after power on, an user will hear a word—"Ready!"—through the earphone (36). Under this condition, if the stick is horizontally placed or suspended in the air and the free steering caster (40) is not in touch with the ground, the control circuit in the control box (20) will judge if the stick is not in use or the user fell to the ground (this will be described further), and a voice—"Pick up your stick, otherwise will call for help 5 seconds later"—will be generated through the earphone (36).

A range finder (34) and a moving object detector (35) are mounted on the handle (30) at the front of which the effective range is respectively set within 1.2 meters. Before starting to walk, one may hold the handle (30)

with one hand and turn it around to detect the environment. If a voice—"Obstruction!"—is heard through the earphone (36), one shall have to turn the handle (30) to another direction until the range finder (34) detects a clean target direction for walking. When walking, the moving object detector (35), which is a kind of infrared detector and mounted on the handle (30) at the front below the range finder (34), starts to continuously detect the front environment within a range of 1.2 meters. If any moving object signal is detected, the control box (20), which is connected to the supporting rod (10) at the bottom will generate a voice—"Excuse me, let me pass!".

Figure 2:
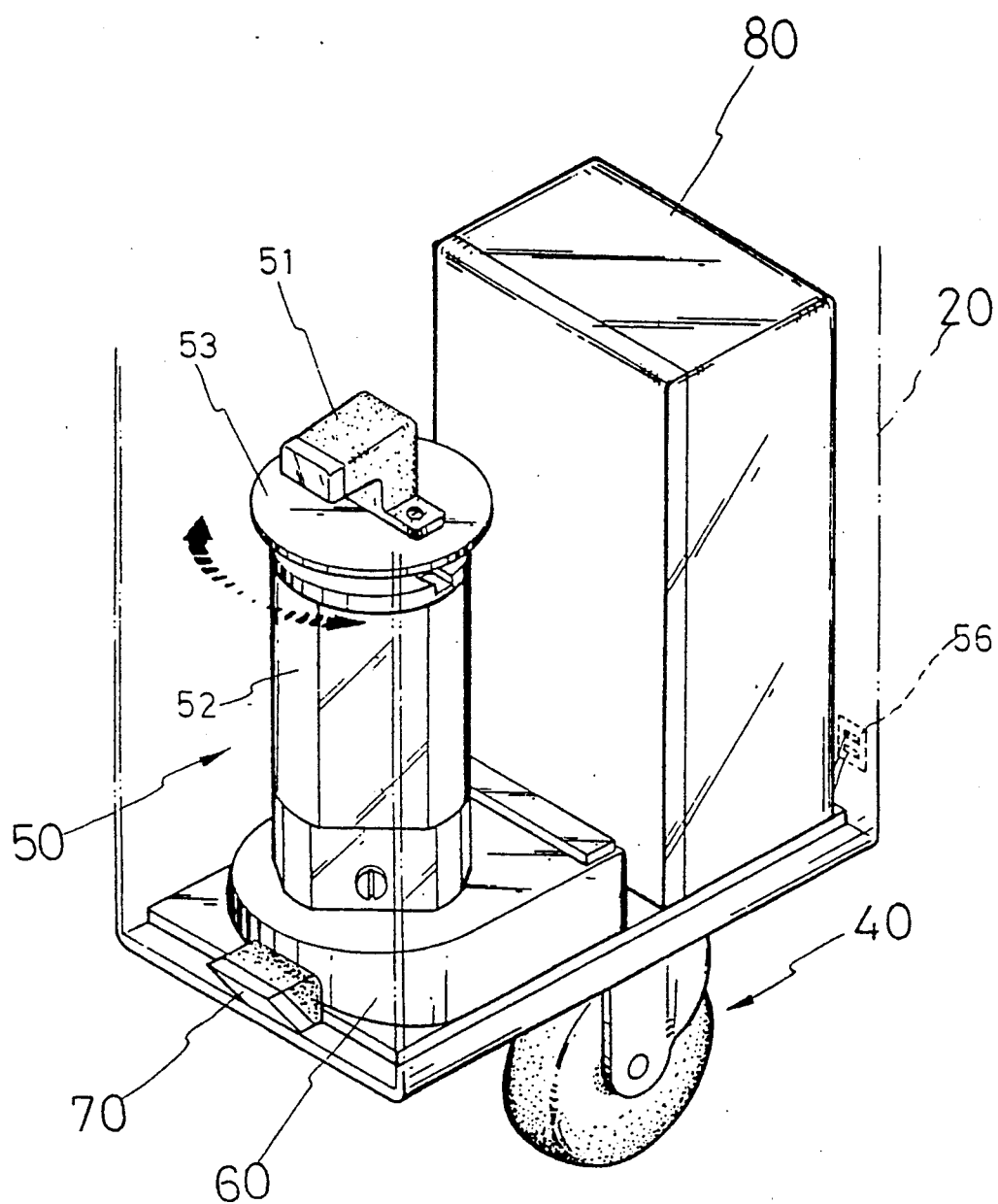
FIG. 2 is a perspective view of a control box according to the present invention.

Referring to FIG. 1 again, the control box (20) (which will be described further in FIG. 2) is connected to the supporting rod (10) at the bottom to bear the total weight of the stick so that a blindman can very conveniently manipulate the stick as shown in FIG. 2, the control box (20) comprises internally a horizontal scanning device (51) and a ground surface detector (70). As shown in FIG. 1, the control box has an external horizontal scanning window (21) and a ground surface detecting window (22) to efficiently detect ground surface condition and any front obstructions while moving. Two acrylic cover boards (23) are bilaterally mounted on the control box (20) with small flash lights respectively set at the inner side for use while walking in the night.

Referring to FIG. 2, a main control case (80) is mounted on the control box (20) internally at the back side having received therein a rechargeable battery and a control processing circuit board. A scanner holder (50) is set inside the control box (20) at the front of the main control case (80) having mounted thereon a horizontal scanning device (51) scanning device secured to a perforated circular aluminum plate (62) (FIG. 4) via the revolving shaft of a DC motor (52). The horizontal scanning device (51) is controlled to make a horizontally reciprocating motion within an angle of 30 degrees, by a scanner controller (60) set at the bottom of the DC motor (52), so as to constantly perform a 30 degrees sector scanning process while moving, and to constantly send scanning signals to the main control case (80) for processing (the control processing process will be outlined in FIG. 4). A charging socket (56) (FIG. 2) is located on the control box (20) at the back side for connection thereto of a battery charger to charge the battery set therein.

Figure 3:
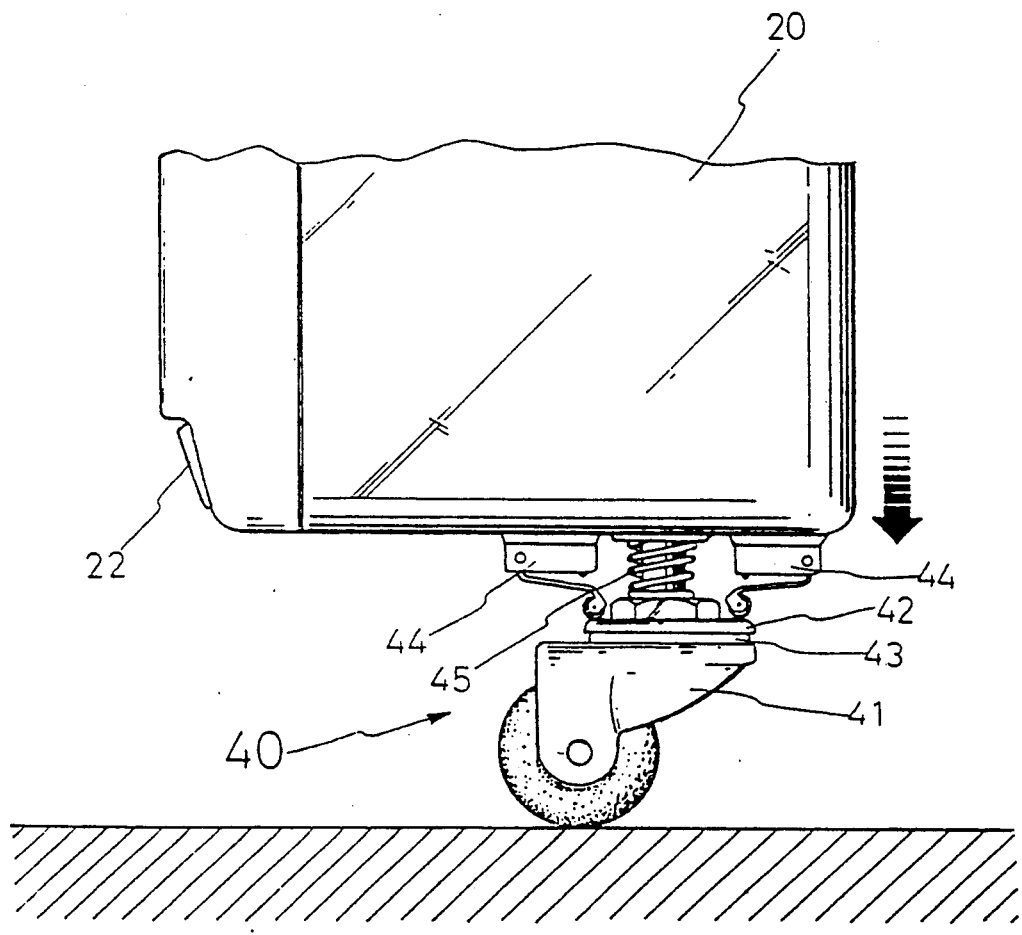
FIG. 3 is a schematic drawing illustrating the structure of a free steering caster according to the present invention.

FIG. 3 illustrates the structure of the free steering caster (40). The free steering caster (40) is movably secured to the control box (20) at the bottom with the caster holder (41) coupled with a fixture (42), which is mounted on the control box (20) at the bottom, through a bearing (43). Through the effect of the bearing (43), the caster (40) is allowed to steer in all directions by means of the control through the supporting rod. Therefore, a blind man can very easily control the moving of the FIG. 1 electronic talking stick. A spring (45) is set between the fixture (42) and the control box (20). According to the present invention, the total weight of the battery and other component parts set inside the control box (20) is approximately 0.8 kg. Therefore, the load of the control box (20) constantly presses on the spring (45) to trigger the micro-switches (44) to continuously operate (this will be outlined further) and to send normal operation signal to a control processing circuit for processing.

Referring to FIG. 2 again, the ground surface detector (70) of the control box (20) is arranged to detect a range within 0.3 meter, the detecting direction of which is 45 degrees downward to horizontal level so as to constantly detect front ground surface condition at a 45 degrees angle of inclination. The detected signal from the ground surface detector (70) will be sent to a control processing circuit for treatment.

Figure 4:
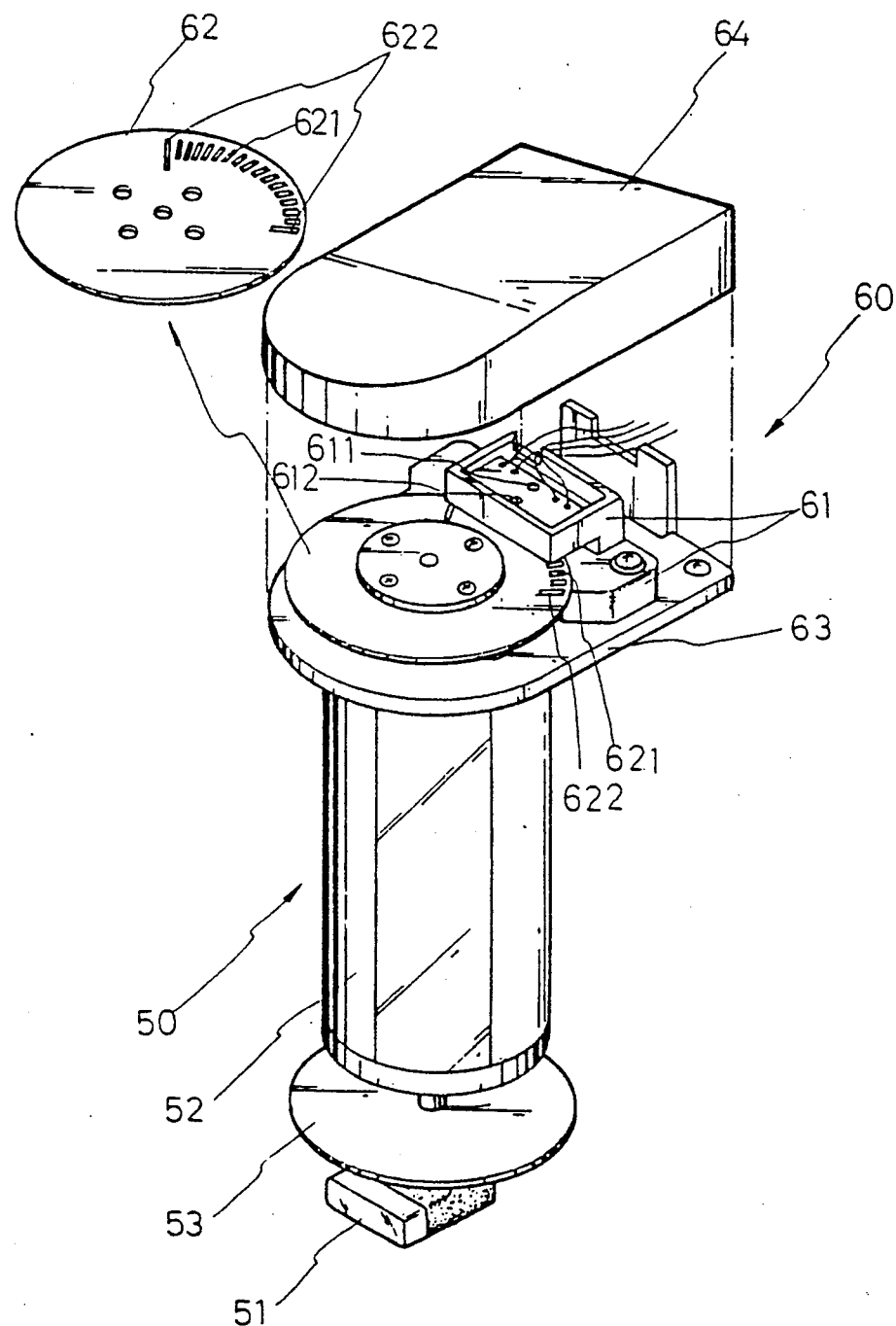
FIG. 4 is a schematic drawing illustrating the structure of a horizontal scanning device according to the present invention.

Referring to FIG. 4, the horizontal scanning device (60) is generally comprised of a base (63) for securing thereto of the DC motor (52), an optical sensor (61) mounted on the base (63), a perforated aluminum circular plate (62) coupled with the motor shaft of the DC motor (52) at the top and set at the front of the optical sensor (61) while the horizontal scanning device (51) is coupled with the motor shaft of the DC motor (52) at the bottom (as viewed in inverted FIG. 4). The optical sensor (61) includes a pair of transceivers (611) and (612), to respectively read the information from the data holes (621) and 622 of the aluminum circular plate (62). The data holes (621) are comprised of fifteen holes, while the side holes (622) are comprised of two rectangular holes having approximately double the size of the data holes (621) and being respectively set at both sides of the data holes (621). When in operation, the DC motor (52) will be triggered to revolve reversely immediately after the transceiver (612) receives a signal from either of the side holes (622). Thus, the aluminum circular plate (62) will be driven to make reciprocating motion within a 30 sector plane. During reciprocating motion of the aluminum circular plate (62), an intermittent signal will be resulted from the data holes (621) through the transceiver (611). The intermittent signal from the transceiver (611) as well as the signal detected by the horizontal scanning device (51) are simultaneously sent to a control processing circuit for comparison, analysis and treatment for further judging if there is any obstructions in front of the user. (With respect to the principle of comparison, analysis and treatment, please refer to the circuit flow chart.)

Figure 5:
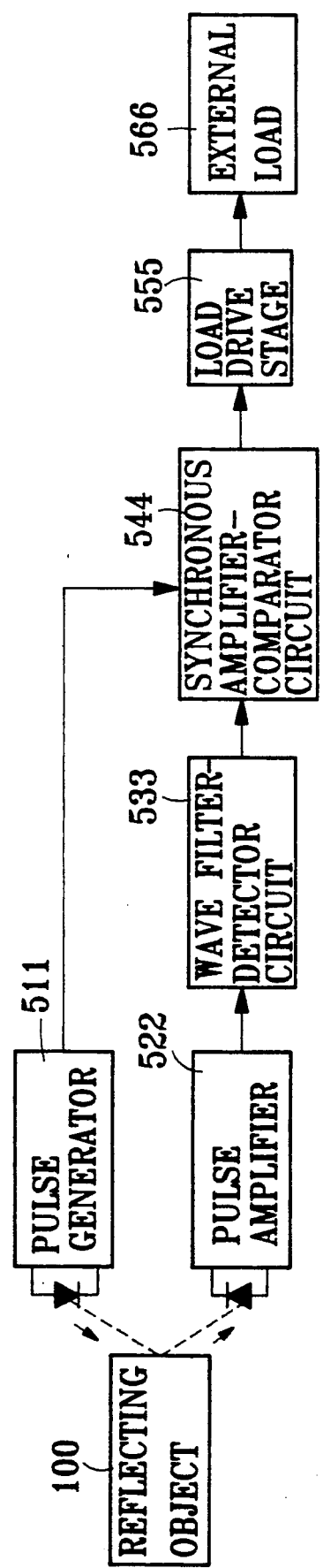
FIG. 5 is a block diagram of the scanning device of the present invention.

Referring to the block diagram of the scanning device 51 of the present invention as shown in FIG. 5. and according to the present invention, the scanning process of the horizontal scanning device (51) is made through infrared ray reflection. It is generally comprised of seven parts as outlined hereunder:

Pulse generator (511): to constantly produce a fixed frequency so as to emit a narrow light beam through a diode, and to operate when power supply is connected;

Pulse amplifier (522): to amplifier the weak infrared signal received;

Wave filter-detector circuit (533): generally comprised of a band-pass filter circuit to eliminate noises and to pick up required signal;

Synchronous amplifier-comparator (544): to amplify the main signal picked and to compare the main signal with the frequency transmitted (Because the main signal may be attenuated during posterior filtration process, it must be amplified again for comparison with the frequency transmitted;

Load drive stage (555): because load consumes higher rating, an additional drive is required; and Reflected radio wave from a reflecting object (100) is sent to the pulse generator (511) and load drive (555) may be connected to external load (566).

Figure 7:
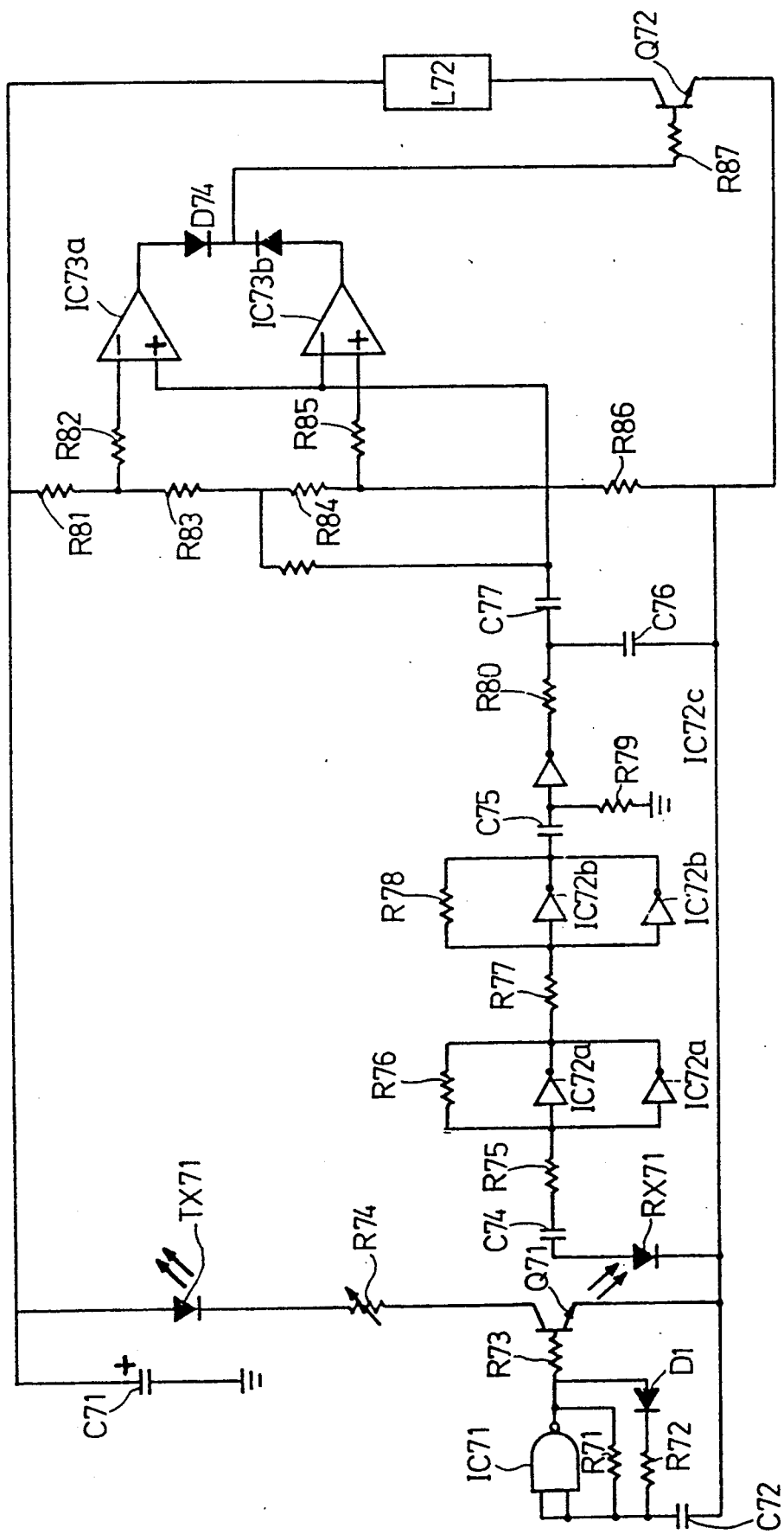
FIG. 7 is a circuit diagram of the scanning system of the present invention.

Please refer to the scanning system circuit of the present invention as illustrated in FIG. 7. As illustrated, the scanning system circuit is generally comprised of a power supply and a main voltage circuit of relay at load, in which the detecting head is connected to another low voltage circuit at load through a 3-core cable. Because the main circuit is separately received in the box while the detecting head is exposed to the weather, it is very safe in operation. In the scanning circuit as illustrated in FIG. 7, IC71 is a standard Schmitt trigger-oscillator, C72 is from R72, R73 to transistor Q71, and it picks up a small current gain value 50 to drive a 500 mA electric current to emit through an infrared diode TX71, wherein the emitting range may be adjusted through R74 by changing the electric current gain value.

The reflected infrared light beam will be detected by the photodiode RX71. A filter network may be set in front of the light collecting lens to eliminate interference from pulse mode light source such as filament tube, discharging lamp or TV screen. Regular tungsten filament tube may produce infrared radiation, however, it does not make trouble because only weak energy will be resulted during each cycle the tungsten filament is heated and cooled down. The pulse which enters through the photodiode RX71 is a low level pulse and will be treated through a filter circuit composed of resistors R75 and IC72a to attenuate noises and pick up the pulse required. The pulse picked is sent through resistor R77 for dropping process to further be sent to another filter circuit comprised of R78 and IC72b. The former filter circuit is to cut off noisy signal of the front half cycle of the pulse while the latter is to cut off noisy signal of the rear half cycle of the pulse. Therefore, a right pulse can be obtained after passing through the capacitor C75. The right pulse thus obtained is further buffered through reverse stage IC72c and sent to computing amplifier stage IC73. Before going into the computing amplifier state, the pulse will be trimmed through resistor R80, capacitor C77 and C76 to make the wave form more accurate.

IC73a and IC73b are standard computing amplifier. Because the gain value is very high, any weak voltage entry from input end may cause big wave motion at output end. The resistors R81, R82, R83, R84, R85 and R86 form a voltage divider. The biased voltage from the voltage divider is sent to a transistor Q72 via a resistor R87 to control the load L72. The load L72 may vary with the function required.

Figure 6:
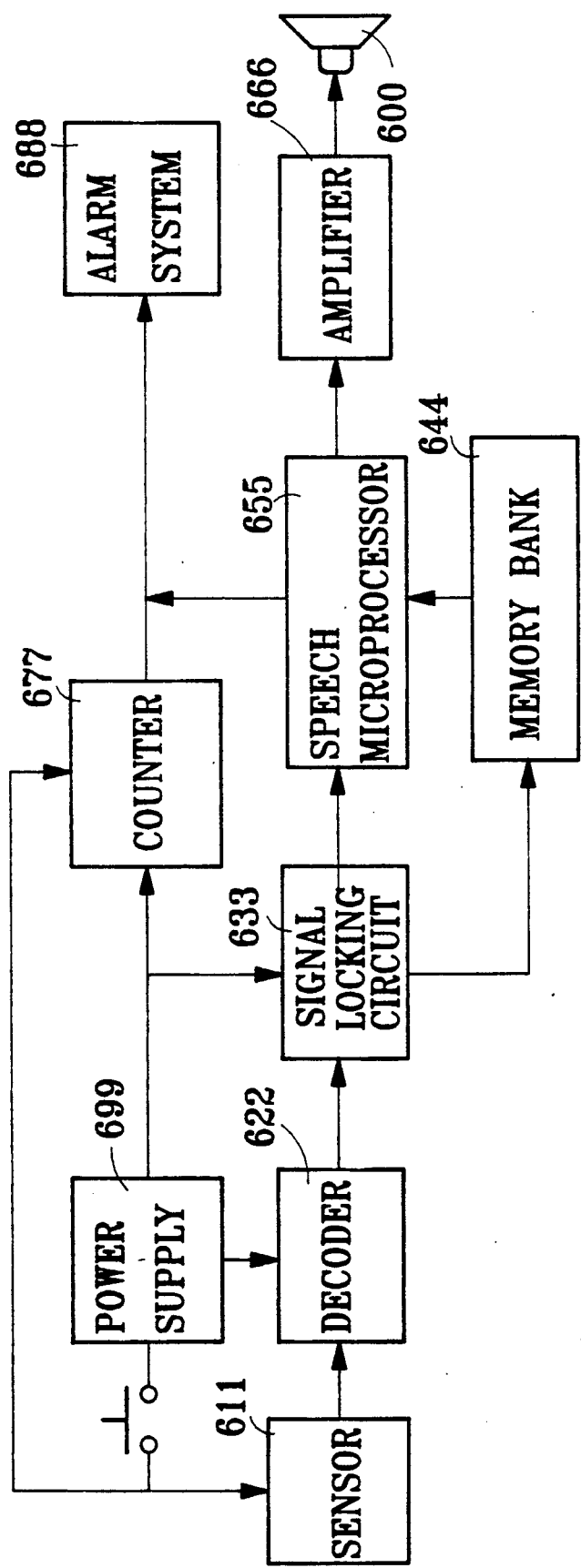
FIG. 6 is a flow chart illustrating a scanning detection signal processing procedure according to the present invention.

FIG. 6 is a flow chart illustrating the process in treating scanning detection signal according to the present invention. When sensor (611) receives a signal reflected from an object, the reflected signal is immediately sent to decoder (622) for identification. The decoded signal from the decoder (622) is further locked at signal locking circuit (633). During output of locked signal from locking circuit (633), a corresponding speech data is picked up from a memory bank (644) and concomitantly sent to a voice microprocessor (655) for digital-analog conversion. The weak voice pulse thus obtained is further sent to an amplifier (666) for audio frequency amplification and for further output through a speaker (600). The voice from the speaker (600) can thus be received and understood by people. During the process, the power supply (699) is to provide the circuit with required working power, and the counter (677) is to send the signal provided by the voice microprocessor (655) to drive a warning system (688).

Figure 8:
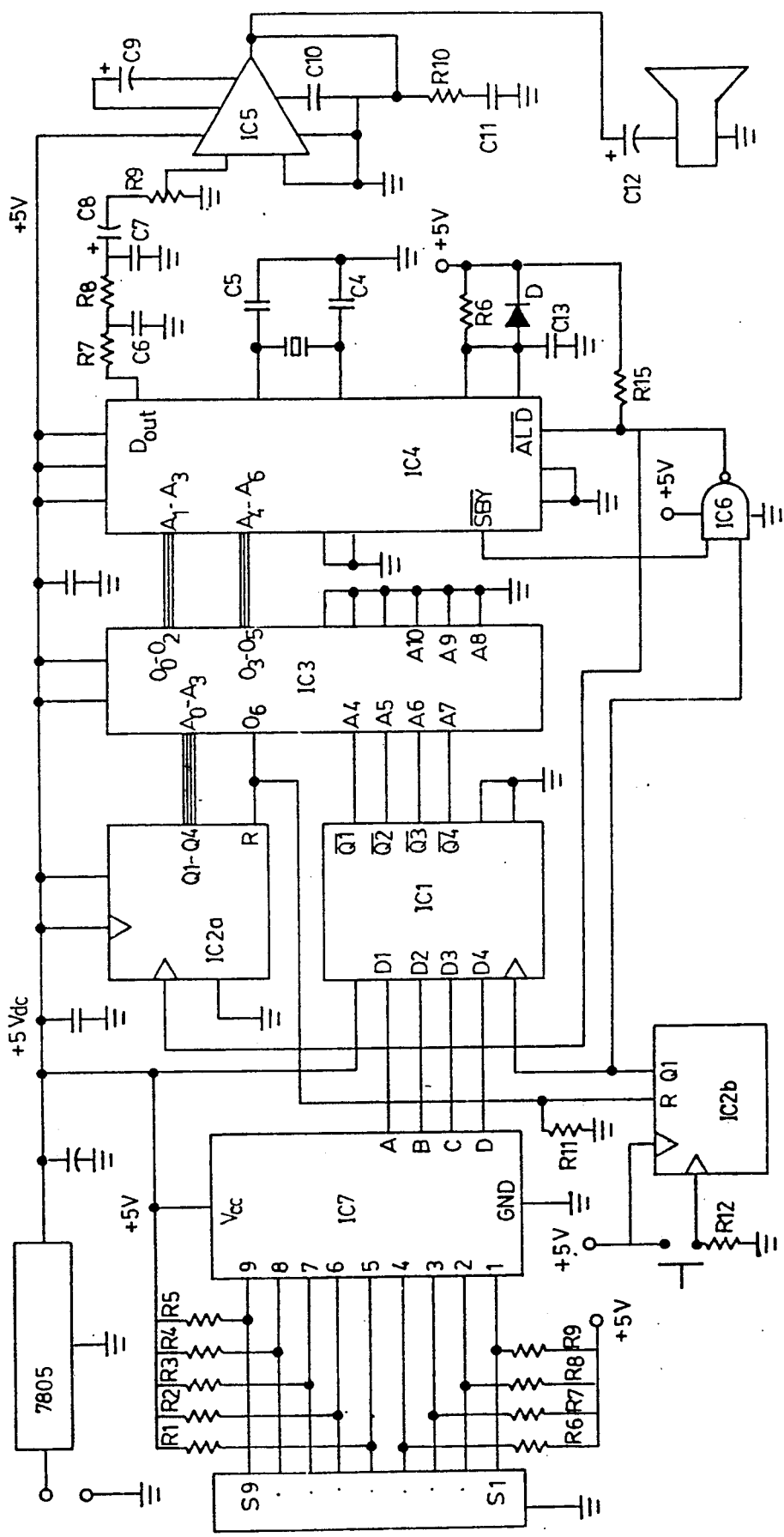
FIG. 8 is a scanning detection signal processing circuit diagram of the present invention.

FIG. 8 is a scanning detection signal processing circuit diagram of the present invention. The language processor and the speaker of the present circuit will provide an output whenever an obstruction is encountered. For example, when infrared sensor S1 is triggered, a corresponding voice will be provided through the speaker.

IC7 is (74HC147) 10 vs 4 lines priority coder for checking if any triggering signal input, the input terminals of which are respectively connected to the output loads of the infrared sensors S1-S9, and the input terminals connect a 20K resistors R1-R9 to +5 V, for example, when the infrared sensor S1 is not triggered, the logic is 1, and the logic will become 0 when signal is triggered. When the infrared sensor S1 is triggered, IC1 locks the A, B, C, D of the encoder IC7 and simultaneously triggers the flip-flop IC2b. The reverse output terminals Q1-Q4 of the IC1 are respectively connected to the ends A4-A7 of the programmable read-only memory IC3. IC2a is a CD4520 counter the output terminals of which are respectively connected to the ends A0-A3 of the read-only memory IC3 to scan memory area in proper order. As soon as the infrared sensor S1 is triggered, the end Q1 of the flip flop IC2b becomes high potential. Each time NAND gate IC6 produces a pulse wave in negative direction, a pre-determined program is picked up from the programmable read-only memory IC3 and sent to the voice processor IC4 through the input end ALD. For example, when the direction of an obstruction detected is 5 (the DCBA of the IC7 are 0101), a voice of right forward will be provided through the speaker. When a voice is delivered, the end SBY of the voice processor IC4 becomes low potential, and therefore, the NAND gate IC6 will drive the counter IC2a to add by 1 automatically when it is at positive edge. Each voice report must include 1-7 allophones. A 4H and 44H 16 numbering system data will be provided to reset the voice processor after each program is executed, and at the same time, the end 06 of the programmable read-only memory IC3 will become high potential to reset the counter IC2a and the flip-flop IC2b and to further turn the circuit to start status.

Voice amplification is made through a low rating audio frequency amplifier. When audio frequency signal is picked up from the pin Dout of the IC4, it is filtered through a type filter circuit (R7, R8, C6, C7 and C6 form a type filter circuit) to eliminate noises therefrom, and sent to the amplifier IC5 for maximum 200 mw amplification, wherein the capacitor C9 is to change amplified gain, and the well amplified voice is sent through the capacitor C12 to the speaker.

Figure 9:
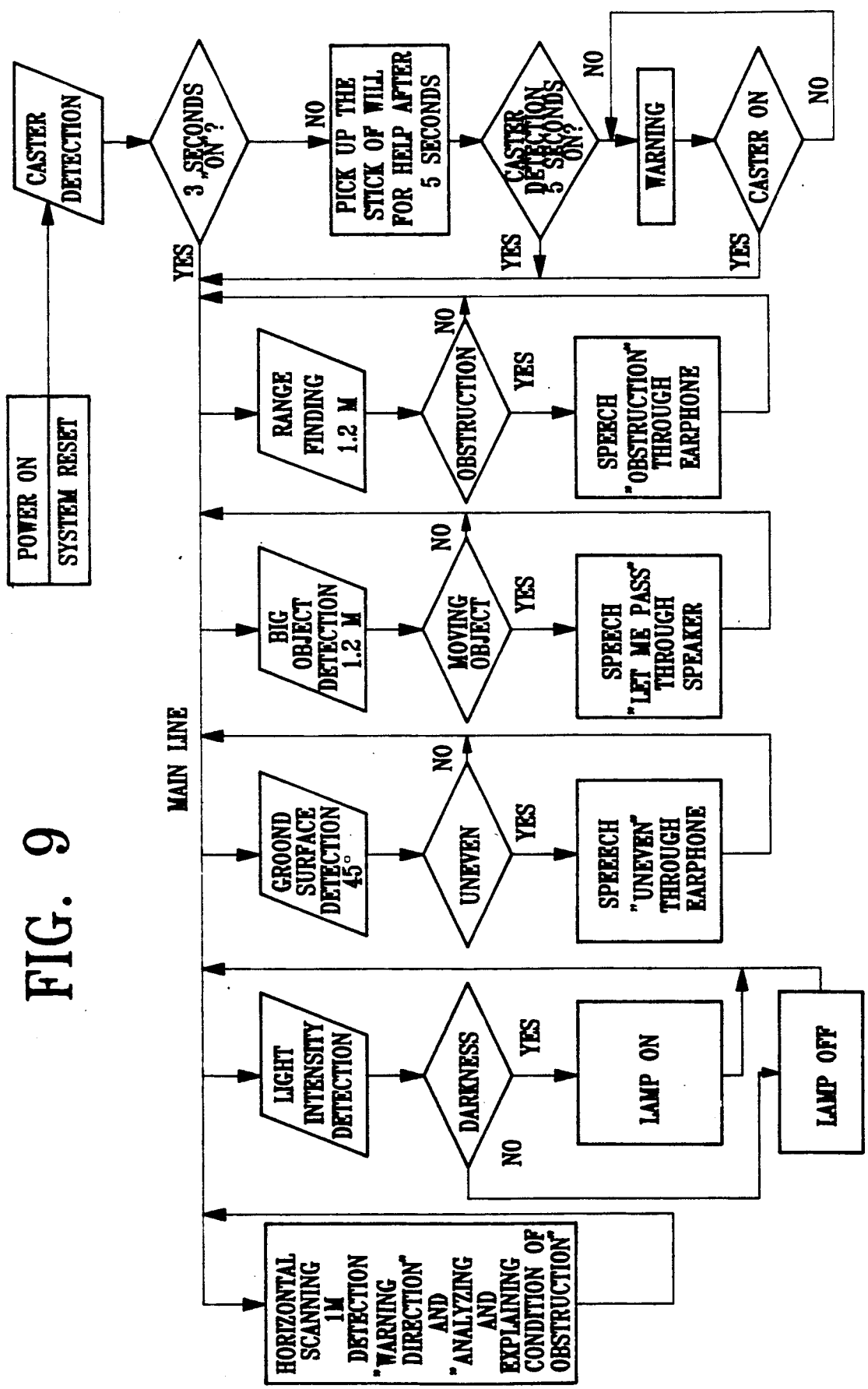
FIG. 9 is a flow chart illustrating the control process of the present invention.

The control process of the present invention is outlined as illustrated in FIG. 9. When power supply is connected, the system is reset to detect if the caster touches the ground due to operation of switches 44 by the weight of the talking stick. If the caster does not touch the ground within 3 seconds, it informs the user—"Pick up the stick or will call for help after 5 seconds" An audio warning will be provided 5 seconds thereafter if the caster is still not in touch with the ground. If the user starts to use the present invention and the caster is pressing on the ground, the range finder 34 and the moving object detector 35 will simultaneously detect if there is any obstructions or moving objects within 1.2 meters. If no signal is detected, the user may keep moving forward. If any obstruction is detected, a voice of "Obstruction!" will be sent through the earphone to inform the user; or a voice—"Please let me pass!" will be provided through the speaker if any moving object is detected. During operation, the ground surface detector 70 keeps detecting ground surface condition through a 45 degree inclination angle, and the horizontal scanning device 51 detects a horizontal area within 1 meter. All detected signals will be converted into corresponding voice to inform the user of the condition of obstructions and the obstructed direction. The light detector is to detect the intensity of outside light and to turn on the flash lights behind acrylic boards 23 under ambient dark conditions.

Figure 10:
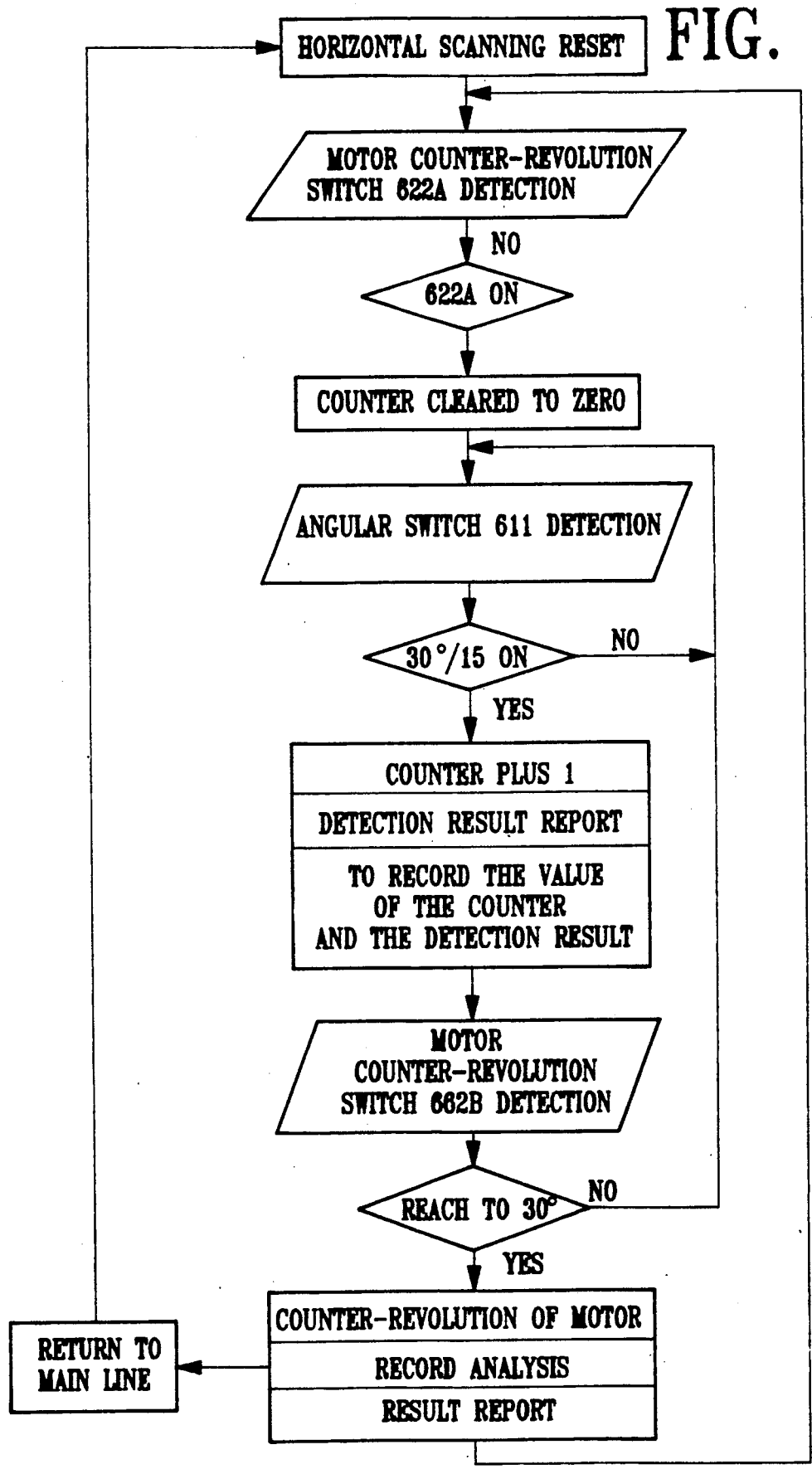
FIG. 10 is a flow chart illustrating the horizontal scanning process of the present invention.

FIG. 10 is a flow chart illustrating the operation of the horizontal scanning detection of the present invention. When the present invention is in use, the motor counterrevolution switch starts to operate, the horizontal scanning device starts to detect any obstruction, the counter of the control processing circuit board is cleared to zero, and horizontal data holes (total 15 holes) detection switch starts to detect. If any obstruction signal is detected, the counter will add by 1 to report detection result and to record the value of the counter as well as the detection result. Under this condition, if the revolution of the motor does not reach an angle of 30 degrees the system operates to continuously detect obstructions; if the motor reaches an angle of 30 degrees, it changes revolving direction immediately, and the record is analyzed and the result is reported. Then, it returns to start and the result is sent to main control circuit.

The data reading (signal detection) mode of the horizontal scanning device (51) through the aluminum circular plate (62) is outlined hereinafter. Referring to FIG. 4 again, the aluminum circular plate (62) includes 15 data holes (621) divided into left, middle and right regions, i.e. each region includes 5 data holes, wherein the five data holes (1-5) of the left region correspond to the reading range of the data detected from front left area; the middle five data holes (6-10) of the middle region correspond to the reading range of the data detected from the right front area; the five data holes (11-15) of the right region correspond to the reading range of the data detected from the left front area.

If a signal is detected through the fifth hole of the left region as well as the first hole of the right region, the signal is immediately sent to the control processing circuit board for processing and it is meant that an object is detected at the front left area. If a signal is detected through three holes concomitantly, it is recognized that a big obstruction is detected. If a signal is detected only through one single hole, it is meant that the size of the obstruction is too small to interfere with walking. According to the present invention, the horizontal scanning device is designed to detect a range within 1 meter, which range will be sufficient for a blind-man to turn one's walking direction.

Having shown and described a preferred embodiment of the present invention by way of example, it should be realized that structural changes could be made and other examples given without departing from either the spirit or scope of this invention.

What is claimed is:

1. An electronic talking stick for: the blind, including:
a supporting rod having an upper end and a lower end;
a handle structure mounted on the upper end of said supporting rod, said handle structure comprising a power switch, an earphone socket, a range finder, and a moving object detector;
a control box connected to the lower end of said supporting rod, said control box comprising a horizontal scanning window, and a ground surface detecting window;
a horizontal scanning device within said control box in registry with said horizontal scanning window, a ground surface detector within said box in registry with said ground surface detecting window, and an encased control processing circuit board within said box;
a caster means extending downwardly from said control box, said caster means including a holder resiliently connected to said box and a free steering caster wheel carried by said holder; and switch means interposed between the box and a caster means for actuation by the weight of the box on the caster means;
characterized in that said control processing circuit board will judge if said caster means does not touch sthe ground, and will send a voice warning signal "Please pick up the stick or will call for help after 5 seconds" to inform the user through said earphone; said range finder of said handle detects a front obstruction during moving of the stick, and sends any detected obstruction signal to said control processing circuit board to convert the detected signal into a voice "front obstruction!" to inform the user through the earphone; said moving object detector of said handle detects front moving objects during moving of the stick and sends any detected moving object signal to said control processing circuit board for processing, to further provide a voice —"Please let me pass!"; said ground surface detector of said control box detects the ground surface during moving of the stick and sends the detected signal to said control processing circuit board for processing to further provide a voice —"Uneven ground"—to inform the user through the earphone; and said horizontal scanning device detects objects through said horizontal scanning window to direct signals to said control processing circuit board for processing, to thereby provide warning-direction and obstruction-type information.

2. The electronic talking stick for the blind according to claim 1, wherein the control processing circuit board includes a scanning detection circuit, a decoder, a signal locking circuit, a memory bank, a voice microprocessor, an audio frequency amplifier, a speaker, a power circuit, a counter and a warning system, and the control processing circuit board is operated in a manner that said scanning detection circuit sends any obstruction or moving object signal to said decoder for decoding and further to said signal locking circuit for signal lock-out, to further pick up a pre-stored voice data from said memory bank to said voice microprocessor for digital-analog conversion during output of signal lock-out, the converted signal being further amplified through said audio frequency amplifier to further be delivered through said speaker to provide a hearable and understandable human language, and said counter being simultaneously in control of said voice microprocessor to send a signal to control the triggering time of said warning system.

3. The electronic talking stick for the blind according to claim 2, wherein the scanning detection circuit of the control processing board includes a pulse generator, a pulse amplifier, a wave filter-detector circuit, a synchronous amplifier-comparator and a load drive stage, and the scanning detection circuit of the control processing board is operated in a manner that when said pulse amplifier receives a signal generated by said pulse generator and reflected by a reflecting object, the signal is amplified by said pulse amplifier, filtered through said wave filter-detector circuit and further amplified by said synchronous amplifier-comparator and compared with the signal (frequency) transmitted by said pulse generator to further drive the load by means of said load drive stage.

4. The electronic talking stick for the blind according to claim 1, wherein the handle is connected to the telescopic supporting rod by means of a control knob (31) which is to control the angular position of the handle on the supporting rod.

5. The electronic talking stick for the blind according to claim 1, wherein the main control case of the control box includes further a rechargeable battery and a charging socket.

6. The electronic talking stick for the blind according to claim 1, wherein the horizontal scanning device of the control box is secured to an aluminum circular plate coupled with the motor shaft of a motor and the scanning control device in the control box controls said motor to make reciprocating motion within a sector range of 30 degrees so as to detect front 30 degrees sector area conditions.

7. The electronic talking stick for the blind according to claim 1, wherein the control box includes further a fixture at the bottom with a spring set therebetween to connect with the caster holder of the caster through a bearing.

8. The electronic talking stick for the blind according to claim 1, wherein the control box further includes two acrylic cover boards bilaterally mounted thereon with small flash lights respectively at the inner side, said flash lights being controlled by the control processing circuit board to flash at dark.

* * * * *